United States Patent [19]

Harris, Jr. et al.

[11] Patent Number: 4,758,952

[45] Date of Patent: Jul. 19, 1988

[54] PROCESS FOR HEAT TRANSFER PRINTING

[75] Inventors: Charles F. Harris, Jr.; Michael S. Williams, both of New Castle, Del.

[73] Assignee: P & S Industries, Inc., Wilmington, Del.

[21] Appl. No.: 934,803

[22] Filed: Nov. 24, 1986

[51] Int. Cl.⁴ .................... G06F 3/12

[52] U.S. Cl. .................... 364/300; 364/900; 8/471

[58] Field of Search .................... 364/300, 900, 478; 8/471

[56] References Cited

U.S. PATENT DOCUMENTS

| | | | |
|---|---|---|---|
| 4,367,071 | 1/1983 | Mizuno et al. | 8/471 |
| 4,514,815 | 4/1985 | Anderson | 364/478 |

*Primary Examiner*—Raulfe B. Zache

*Attorney, Agent, or Firm*—Mortenson & Uebler

[57] ABSTRACT

A process is provided for transfer printing into a substrate comprising applying onto a temporary transfer support in a desired pattern a heat transfer printing ink composition comprising a sublimatable dye, fine powder graphite and a strong acid in a carrier liquid, bringing the transfer support containing the ink into close contact with the substrate, the ink being in direct contact with the substrate, thereby temporarily transferring a portion of the ink to the substrate as a result of the direct contact, and permanently transferring the ink into the substrate by applying heat and, optionally, pressure. Suitable substrates into which the desired pattern may be transferred include paper, wood, plastic, natural cloth, synthetic cloth, carpet material, concrete, glass, metal such as steel, porcelain and ceramic. The process may include applying the ink to the transfer support by a computerized process including inputting an image of a desired pattern into a computer central processing unit having a keyboard and a peripheral video display terminal and printer by means of an optical character reader, employing in the printer the heat transfer printing ink composition of the invention, and printing the desired pattern onto conventional computer paper, the computer paper becoming the temporary transfer support. The process may include a modem and the printer may be located remote from the central processing unit and printing may be accomplished by the printer via the modem.

6 Claims, 1 Drawing Sheet

PROCESS FOR HEAT TRANSFER PRINTING

BACKGROUND OF THE INVENTION

This invention relates to heat transfer printing and, more particularly, to an ink composition for use in heat transfer printing on numerous substrate materials.

In general, ink compositions and methods for heat transfer printing onto substrates are known. For example, processes for heat transfer printing are disclosed in U.S. Pat. Nos. 3,647,503; 3,649,332; 4,271,224; 4,253,838; 4,278,434; and 4,367,071, in which a sublimatable dye is used to transfer an image to a substrate, mainly by sublimation, but also possibly by melting and evaporation.

It has been known to employ ink compositions having basic dyes or their derivatives, a strong base and a binder and solvent. For example, U.S. Pat. No. 4,272,292 discloses an ink composition for heat transfer printing comprising at least one of carbinol bases of basic dyes or their derivatives, a strong base, a binder and a solvent for dissolving the binder.

The present invention provides an ink composition and a process for heat transfer printing which are not disclosed in, nor suggested by, the known prior art.

SUMMARY OF THE INVENTION

A heat transfer printing ink composition is provided comprising a sublimatable dye, fine powder graphite and a strong acid in a carrier liquid. The carrier liquid may be white oil or a combination of white oil and toluene or a combination of white oil and other diluent. The diluent may be any liquid which does not react with the other components, and is compatible with the oil, in an amount which imparts the desired consistency to the ink composition. Water is excluded as being incompatible with the oil. The strong acid may be muriatic acid, tannic acid, stearic acid or other strong acid, and is preferably a combination of muriatic acid, tannic acid and stearic acid. The ink composition preferably is one wherein the sublimatable dye is present in an amount from about 31.99 to about 83.93 weight percent, the fine powder graphite is present in an amount from about 4.35 to about 0.01 weight percent, white oil is present in an amount from about 30.00 to about 14.25 weight percent and the strong acid is present in an amount from about 33.66 to about 1.81 weight percent, wherein all weight percents are based on the total weight of the dye, oil, graphite and acid components. A diluent may be employed in the ink composition such as, for example, sufficient toluene to achieve the desired consistency.

Also provided is a process of transfer printing into a substrate comprising applying onto a temporary transfer support a heat transfer·printing ink composition comprising a sublimatable dye, fine powder graphite, a solvent and a strong acid in a desired pattern, bringing the transfer support containing the ink into close contact with the substrate, the ink being in direct contact with the substrate, thereby temporarily transferring a portion of the ink to the substrate as a result of the direct contact, and permanently transferring the ink into the substrate by applying heat and, optionally, pressure. In an alternate embodiment, prior to the application of heat and after the temporary transfer of ink to the substrate, the support and substrate are separated and the substrate containing the ink is brought into close contact with at least one other substrate, the ink being in direct contact with the other substrate, thereby temporarily transferring a portion of the ink to the other substrate as a result of the direct contact, and then permanently transferring the ink into the other substrate by applying heat and, optionally, pressure.

The transfer support is preferably a sheet of paper and the substrate into which the image is transferred may be paper, wood, plastic, porous plastic, natural cloth, synthetic cloth, carpet material, concrete, glass, metal, such as steel, porcelain, ceramic and other substrates which can withstand the heat of transfer needed to transfer the ink.

The process may include applying the ink to the transfer support by a computerized method including inputting an image of a desired pattern into a computer central processing unit having a keyboard and a peripheral video display terminal and printer by means of an optical character reader, employing in the printer the heat transfer printing ink composition, and printing the desired pattern onto conventional computer paper, the computer paper becoming the temporary transfer support. The pattern may be displayed on the video display terminal and modified as desired prior to printing, either through the keyboard or by means of suitable software and a "mouse". The process may include a modem and wherein the printer is located remote from the central processing unit and the printing is accomplished by the printer via the modem.

Mutiple colors may be employed in the printer to produce a desired multicolored pattern.

Figure 1:
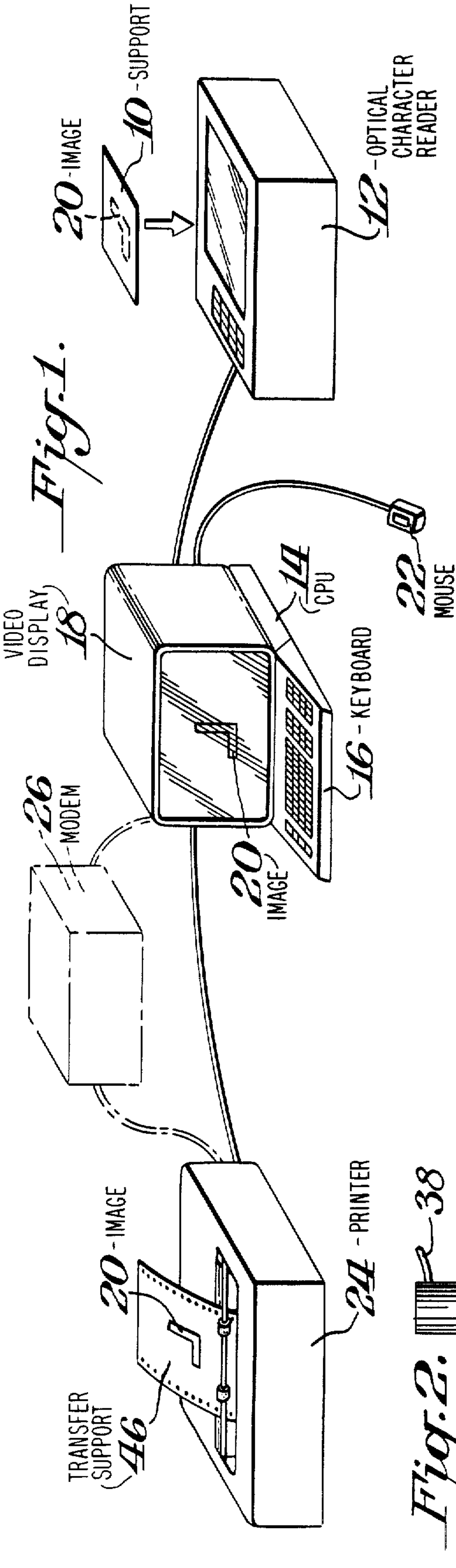
FIG. 1 shows the elements and equipment preferably used to produce a computer generated transfer support having a desired image thereon of the ink composition according to the invention.

DETAILED DESCRIPTION OF THE INVENTION AND PREFERRED EMBODIMENTS WITH REFERENCE TO THE DRAWINGS

A heat transfer printing ink composition if provided comprising a sublimatable dye, fine powder graphite and a strong acid in a carrier liquid. Also provided is the process of transfer printing into a substrate comprising applying onto a temporary transfer support in a desired pattern a heat transfer printing ink composition comprising a sublimatable dye, fine powder graphite and a strong acid in a carrier liquid, bringing the transfer support containing the ink into close contact with the substrate, the ink being in direct contact with the substrate, thereby temporarily transferring a portion of the ink to the substrate as a result of the direct contact, and permanently transferring the ink into the substrate by applying heat and, optionally, pressure. Suitable substrates into which the desired pattern may be transferred include paper, wood, plastic, natural cloth, synthetic cloth, carpet material, concrete, glass, metal such as steel, porcelain and ceramic. The process may include applying the ink to the transfer support by a computerized process including inputting an image of a desired pattern into a computer central processing unit having a keyboard and a peripheral video display terminal and printer by means of an optical character reader, employing in the printer the heat transfer printing ink composition, and printing the desired pattern onto conventional computer paper, the computer paper becoming the temporary transfer support. The process may include a modem and the printer may be located remote from the central processing unit and printing may be accomplished by the printer via the modem.

It has been found that, using the ink according to the invention, one can make a temporary transfer from a transfer, and the transfer is not permanently fixed into the substrate until sufficient heat is applied. For example, the ink may be put on paper and then transferred to the surface of metal, then it can be transferred from metal into cotton, wood, carpet or almost any porous surface. To stop the transfer, one simply applies sufficient heat to the substrate surface, thus fixing the ink permanently to the surface.

The method can be used for multiple transfers to several substrates.

The composition of the ink includes a sublimatable dystuff such as the Intratherm® dyes for heat transfer printing manufactured by Crompton & Knowles Corporation, Gibralter, Pa. Added to the dyes are fine powder graphite, strong acids and preferably a carrier liquid comprising a combination of white oil and toluene. The carrier liquid may be virtually any liquid which does not react with the other components of the composition, added in an amount which provides the desired consistency to the mixture.

The ink composition preferably is one wherein the sublimatable dye is present in an amount from about 31.99 to about 83.93 weight percent, the fine powder graphite is present in an amount from about 4.35 to about 0.01 weight percent, white oil is present in an amount from about 30.00 to about 14.25 weight percent and the strong acid is present in an amount from about 33.66 to about 1.81 weight percent, wherein all weight percents are based on the total weight of the dye, graphite, oil and acid components. A diluent may be employed in the ink composition such as, for example, sufficient toluene to achieve the desired consistency.

The printing inks of the invention can be used for printing in accordance with the customary printing processes such as relief printing, gravure printing, offset printing, film printing or screen printing. In the examples which follow, preferred specific ink compositions for printing into soft substrates such as cloth and for printing into hard substrates such as metal or glass are disclosed.

A detailed description of the process according to the invention and preferred embodiments is best provided with reference to the drawings wherein FIG. 1 shows a preferred method for making an inked temporary transfer support for applying a desired pattern into a substrate.

A key feature of the invention is that the ink is transferred into the various substrates and is not merely applied as a paint layer on the surface of the substrate. This phenomenon is true for hard substrates such as plastic, metal, and even glass, as well as for porous substrates such as cloth and wood.

As shown in FIG. 1, a desired image 20 such as a logo or a photo or anything else capable of being expressed in a 2-dimensional image on a support 10 is placed on optical character reader 12 and, by operation of conventional hardware and software, the image is fed through central processing unit 14 and is displayed on the screen of video display 18. The image displayed on the screen may be modified or edited, either by means of keyboard commands executed through the keyboard 16 or by use of suitable software and a "mouse" 22. Once the desired image is displayed, it must be reversed prior to transferring it to image transfer support 46. Image 20 is shown reversed on the video display screen 18. Printer 24 containing the inks according to the invention is then caused to print the desired reversed image 20 on the transfer support 46 which, in this case, is conventional computer paper.

The printer 24 may be located in close proximity to the central processing unit 14 or it may be at a location remote from the central processing unit. The imaged transfer support can be produced at the remote location via a modem 26 and conventional telephone lines, all shown in phantom in FIG. 1. So long as the remote printer contains the ink according to the invention, the imaged transfer support according to the invention can be produced at any place in the World which is reached by telephone lines.

Suitable hardware to accomplish the above includes, without limitation, an IBM PC/AT central processing unit, a Datacopy Model 230 optical character reader, an OTC printer, model OT-700e, an IBM video display Ser. No. 3762848, a QUADRAM dump box model microfazer, and a Microsoft "mouse". Suitable software includes, without limitation, IBM DOS, Datacopy WIPS730, WIPS Editor, Gem system, Hercules graphics card and IBM PC Paint.

Multiple inks can be employed in the printer to produce a transfer support having a desired multicolored pattern. Multiple colors can be achieved using multiple passes through the printer, one for each color employed. After each pass, the support preferably is heated to 350° F. for 10–20 seconds.

Figure 2:
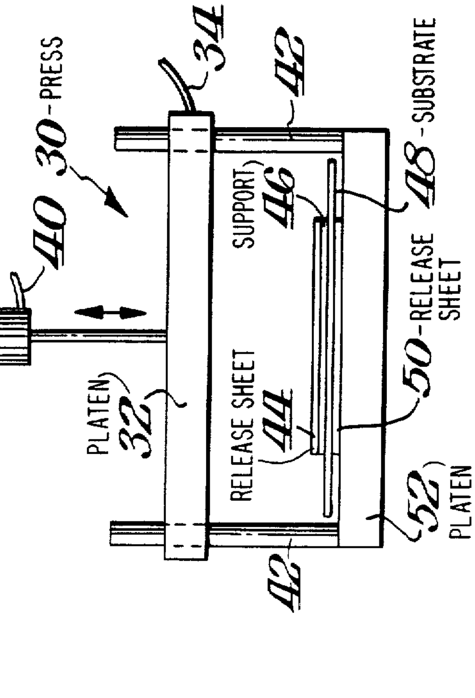
FIG. 2 shows means for applying heat, and optionally pressure, to a desired substrate in contact with an inked transfer support according to the invention.

Once the temporary transfer support 46 is prepared containing the desired image 20, it may be transferred to a desired substrate as shown in FIG. 2. Therein, hydraulic press apparatus 30 is shown wherein the hydraulic cylinder 36 moves heated platen 32 up or down as indicated by the arrows. The desired substrate 48, such as cloth, is placed within the apparatus 30 and preferably is separated from the bottom platen 52 by release sheet 50. The temporary transfer support 46 is placed on top of substrate 48 with the inked image thereon in direct contact with substrate 48. Release sheet 44 is preferably placed on top of the transfer support 46.

If pressure alone is applied to the support 46, then a multiplicity of temporary transfers of image 20 may be made to several different substrates. If a permanent transfer is desired, then sufficient heat is applied, the ink composition goes to the gaseous phase and the desired image is permanently transferred into the substrate. The higher the temperature during transfer, the shorter is the time required to effect the transfer. The temperature should not exceed that which may damage the surface of the substrate.

Various substrates may be employed. Suitable substrates include paper, wood, plastic, natural cloth, synthetic cloth, carpet material, concrete, glass, metal such as steel, porcelain and ceramic. Virtually any substrate can be used which will withstand a temperature of 300° F. for at least 10 seconds. In general, the harder the material, the higher must be the temperature to effect transfer.

Figure 3:
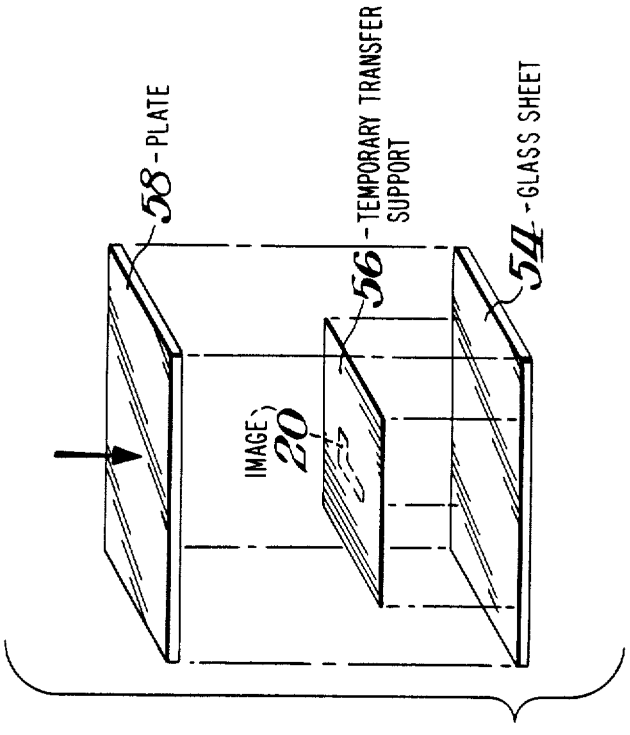
FIG. 3 shows the apparatus used to transfer the ink according to the invention into glass.

FIG. 3 shows a method for transferring an image of the ink composition according to this invention into glass. In FIG. 3, a temporary transfer support 56 containing an inked image 20 is placed on a glass sheet at ambient temperature, the ink being in contact with the cold glass sheet. A plate 58 maintained at at least 1200° F. is applied to the top of the transfer sheet and pressure is applied. Manual pressure will suffice. The ink composition gassifies and the ink is transferred permanently and unexpectedly into the glass sheet 54. The mechanism of transfer is not presently understood. It appears to involve a diffusion process.

The following specific examples are intended to illustrate preparation of the ink composition of the invention but are not intended to limit the scope of the invention in any way.

EXAMPLE 1

To 112.5 ml of white oil (marketed by Tocony Corporation, St. Louis, Mo. under the trademark stainless Lily White Oil) and 265.5 ml of toluene was added 230.74 gm of a sublimatable dark brown dye (marketed by Crompton and Knowles under the trademark Intratherm P-1303). A strong acid composition was prepared by mixing 0.78 gm tannic acid, 0.78 gm stearic acid and 13.15 ml of muriatic acid. Fine powder graphite in the amount of 0.35 gm was added to the dye-oil mixture and the strong acid composition was slowly added to the dye-oil mixture stirring well, to produce an ink composition. This ink composition was worked in a ball mill for 72 hours using a non-reactive milling medium (stones), periodically checking for accumulated gas pressure and relieving the pressure when necessary. The worked composition was allowed to stand for 30 minutes and excess carrier liquid was poured off. This ink composition according to the invention is ready for color mixing or transfer printing according to the techniques described above. This ink is especially suited for transfer printing into relatively soft substrates such as cloth and carpet.

EXAMPLE 2

The same procedure as in Example 1 was used to make a blue ink according to the invention (using Crompton and Knowles sublimatable dye designated P-385). A mixture of 60 weight percent of the blue composition and 40 weight percent of the brown composition of Example 1 was prepared, and this mixture was worked in a ball mill for an additional 4 hours. The resulting mixture was a black ink composition according to the invention, also for transfer printing into relatively soft substrates.

EXAMPLE 3

From the ink composition of Example 1, approximately 20% of the carrier liquid was extracted. To the remaining mixture, 56 ml of muriatic acid was added and the mixture was stirred well for 15 minutes. The mixture was allowed to stand and excess carrier liquid was poured off. The remaining mixture had a pulpy texture. This mixture was heated until all liquid had evaporated, leaving a totally dry ink composition which was then ground to a fine powder using a mortar and pestle. The ink was added to a mixture of 85 ml Lily White Oil and 210 ml of toluene, which produced an ink composition which is especially suitable for transfer printing into relatively hard materials such as wood, plastic, metal and glass, according to the techniques described above.

While the invention has been disclosed herein in connection with certain embodiments and detailed descriptions, it will be clear to one skilled in the art that modifications or variations of such details can be made without deviating from the gist of this invention, and such modifications or variations are considered to be within the scope of the claims hereinbelow.

What is claimed is:

1. The process of transfer printing to a substrate comprising:

applying onto a temporary transfer support in a desired pattern a heat transfer printing ink composition, bringing said transfer support containing said ink into close contact with said substrate, the ink being in direct contact with the substrate, thereby temporarily transferring a portion of said ink to said substrate as a result of the direct contact, and permanently transferring said ink to said substrate by applying heat and, optionally, pressure, wherein said ink is applied to said transfer support by the following computerized method:

inputting an image of a desired pattern into a computer central processing unit having a keyboard and a peripheral video display terminal and printer by means of an optical character reader, employing in said printer said heat transfer printing ink composition, and printing said desired pattern onto conventional computer paper, said computer paper being said temporary transfer support.

2. The process of claim 1 including displaying said pattern on said video display terminal and modifying the pattern as desired prior to printing.

3. The process of transfer printing to a substrate comprising:

applying onto a temporary transfer support in a desired pattern a heat transfer printing ink composition, bringing said transfer support containing said ink into close contact with said substrate, the ink being in direct contact with the substrate, thereby temporarily transferring a portion of said ink to said substrate as a result of the direct contact, and permanently transferring said ink to said substrate by applying heat and, optionally, pressure, wherein said ink is applied to said transfer support by the following computerized method:

inputting an image of a desired pattern into a computer central processing unit having a keyboard and a peripheral video display terminal and printer by means of an optical character reader, employing in said printer said heat transfer printing ink composition, displaying said pattern on said video display terminal, modifying the pattern through said keyboard, and printing said desired pattern onto conventional computer paper, said computer paper being said temporary transfer support.

4. The process of transfer printing to a substrate comprising:

applying onto a temporary transfer support in a desired pattern a heat transfer printing ink composition, bring said transfer support containing said ink into close contact with said substrate, the ink being in direct contact with the substrate, thereby temporarily transferring a portion of said ink to said substrate as a result of the direct contact, and permanently transferring said ink to said substrate by applying heat and, optionally, pressure, wherein said ink is applied to said transfer support by the following computerized method:

inputting an image of a desired pattern into a computer central processing unit having a keyboard and a peripheral video display terminal and printer by means of an optical character reader, employing in said printer said heat transfer printing ink composition, displaying said pattern on said video display terminal, by means of a "mouse", and printing said desired pattern onto conventional computer paper, said computer paper being said temporary transfer support.

5. The process of transfer printing to a substrate comprising:

applying onto a temporary transfer support in a desired pattern a heat transfer printing ink composition, bringing said transfer support containing said ink into close contact with said substrate, the ink being in direct contact with the substrate, thereby temporarily transferring a portion of said ink to said substrate as a result of the direct contact, and permanently transferring said ink to said substrate by applying heat and, optionally, pressure, wherein said ink is applied to said transfer support by the following computerized method:

inputting an image of a desired pattern into a computer central processing unit having a keyboard and a peripheral video display terminal and printer by means of an optical character reader, employing in said printer said heat transfer printing ink composition, and printing said desired pattern onto conventional computer paper, said computer paper being said temporary transfer support, wherein said printer is located remote from said central processing unit and said printing is accomplished by said printer via a modem.

6. The process of transfer printing to a substrate comprising:

applying onto a temporary transfer support in a desired pattern a heat transfer printing ink composition, bringing said transfer support containing said ink into close contact with said substrate, the ink being in direct contact with the substrate, thereby temporarily transferring a portion of said ink to said substrate as a result of the direct contact, and permanently transferring said ink to said substrate by applying heat and, optionally, pressure, wherein said ink is applied to said transfer support by the following computerized method:

inputting an image of a desired pattern into a computer central processing unit having a keyboard and a peripheral video display terminal and printer by means of an optical character reader, employing in said printer said heat transfer printing ink composition, and printing said desired pattern on conventional computer paper, said computer paper being said temporary transfer support, wherein multiple colors are employed in said printer to produce a desired multicolored pattern.

* * * * *